(12) United States Patent
Amar

(10) Patent No.: US 10,220,890 B2
(45) Date of Patent: Mar. 5, 2019

(54) DEFLECTOR ARRANGEMENT FOR A TRACTOR, A TRACTOR, AND A METHOD FOR ADJUSTING A DEFLECTOR ARRANGEMENT FOR A TRACTOR

(71) Applicants: VOLVO TRUCK CORPORATION, Gothenburg (SE); Pascal Amar, Hagerstown, MD (US)

(72) Inventor: Pascal Amar, Hagerstown, MD (US)

(73) Assignee: Volvo Truck Corporation, Göteborg (SE)

( * ) Notice: Subject to any disclaimer, the term of this patent is extended or adjusted under 35 U.S.C. 154(b) by 24 days.

(21) Appl. No.: 15/565,149

(22) PCT Filed: Apr. 15, 2015

(86) PCT No.: PCT/US2015/026009
§ 371 (c)(1),
(2) Date: Oct. 7, 2017

(87) PCT Pub. No.: WO2016/167767
PCT Pub. Date: Oct. 20, 2016

(65) Prior Publication Data
US 2018/0111648 A1    Apr. 26, 2018

(51) Int. Cl.
*B62D 35/00* (2006.01)
*B62D 37/02* (2006.01)

(52) U.S. Cl.
CPC ......... *B62D 35/004* (2013.01); *B62D 35/001* (2013.01); *B62D 37/02* (2013.01)

(58) Field of Classification Search
CPC ..... B62D 35/004; B62D 37/02; B62D 35/001

USPC .................................................. 296/180.2
See application file for complete search history.

(56) References Cited

U.S. PATENT DOCUMENTS

| 4,102,548 | A | 7/1978 | Kangas |
| 4,904,015 | A | 2/1990 | Haines |
| 7,876,202 | B2 * | 1/2011 | Liljeblad ............ B62D 35/001 296/155 |
| 8,162,382 | B2 * | 4/2012 | Hjelm ............... B62D 35/001 296/180.3 |
| 8,496,285 | B2 * | 7/2013 | Rogers ............... B62D 35/001 180/903 |
| 9,550,535 | B2 * | 1/2017 | Malone ............ B62D 35/001 |
| 9,567,017 | B2 * | 2/2017 | Menicovich .......... B62D 35/00 |
| 2003/0155164 | A1 | 8/2003 | Mantini et al. |

(Continued)

OTHER PUBLICATIONS

International Search Report (dated Jul. 9, 2015) for corresponding International App. PCT/US2015/026009.

*Primary Examiner* — Pinel E Romain
(74) *Attorney, Agent, or Firm* — WRB-IP LLP

(57) ABSTRACT

A deflector arrangement for a tractor is provided, the tractor being connectable to a trailer that forms an aerodynamic drag source. The deflector arrangement includes a deflector, a mount for connecting the deflector to the tractor, an arrangement for selectively deploying and retracting the deflector relative to the tractor, a sensor arranged to sense that the trailer that forms the aerodynamic drag force is attached to the tractor and send a loaded signal in response thereto, and a controller arranged to receive the loaded signal from the sensor and to control the selectively deploying and retracting arrangement to deploy the deflector in response to the loaded signal.

20 Claims, 5 Drawing Sheets

(56) References Cited

U.S. PATENT DOCUMENTS

2008/0093886 A1   4/2008   Nusbaum
2008/0197985 A1   8/2008   Liljeblad et al.
2011/0241377 A1  10/2011   Rogers et al.

* cited by examiner

DEFLECTOR ARRANGEMENT FOR A TRACTOR, A TRACTOR, AND A METHOD FOR ADJUSTING A DEFLECTOR ARRANGEMENT FOR A TRACTOR

BACKGROUND AND SUMMARY

The present invention relates generally to deflectors for tractor-trailer combinations and, more particularly, to deflectors that are deployed in response to detection of the presence of a trailer.

Commercial vehicles are one of the key contributors to fuel usage for ground transportation. The power required to propel heavy duty vehicles varies with a number of external factors but depends heavily on the speed of the vehicle. Aerodynamic drag is the predominant contributor to power requirements of such vehicles at highway speeds, but it is significant even at moderate speeds typical of urban, local or regional operation. Reducing aerodynamic drag for these vehicles would therefore yield significant reduction in power requirement and fuel usage.

The force of aerodynamic drag experienced by a vehicle moving down the road at a given speed can be calculated using the following equation:

$$F_{aero\_drag} = \tfrac{1}{2} \cdot \rho \cdot v^2 \cdot Cd \cdot A$$

where:

$F_{aero\_drag}$ is the aerodynamic drag force
$\rho$ is the mass density of the air
$v$ is the velocity of the object relative to the fluid,
A is the front area of the vehicle
Cd is the drag coefficient—a dimensionless coefficient related to the object's geometry This equation shows that for a given speed, the aerodynamic drag can be reduced either by reducing Cd, the drag coefficient of the vehicle, or A, the front area of the vehicle. Trailers and containers are typically taller and wider than tractors; therefore they dictate the front area of the complete vehicle. Aerodynamic deflectors help reduce the drag coefficient Cd of tractor-trailer combinations by directing the onward wind flow smoothly to the trailer or container and thus reducing flow separation in front of the trailer or container. Aerodynamic deflectors can yield significant fuel savings at highway speeds; however, these deflectors also increase the front area of the tractor compared with the same tractor without deflectors, which will result in a fuel penalty of similar relative magnitude when not used in a tractor-trailer combination.

A tractor equipped with aerodynamic deflectors will therefore provide benefits when used in combination with, e.g., a box trailer but will be less efficient than a tractor without deflectors when used in combination with a low trailer or without trailer, and vice-versa.

It is desirable to provide a deflector arrangement that can provide advantageous aerodynamic qualities when a trailer that forms an aerodynamic drag source is attached to a tractor while not significantly adding to drag when, e.g., not connected to a trailer.

According to an aspect of the present invention, a deflector arrangement for a tractor is provided, the tractor being connectable to a trailer that forms an aerodynamic drag source. The deflector arrangement comprises a deflector, a mount for connecting the deflector to the tractor, means for selectively deploying and retracting the deflector relative to the tractor, a sensor arranged to sense that the trailer that forms the aerodynamic drag force is attached to the tractor and send a loaded signal in response thereto, and a controller arranged to receive the loaded signal from the sensor and to control the selectively deploying and retracting means to deploy the deflector in response to the loaded signal.

According to another aspect of the present invention, a tractor for a tractor-trailer combination comprises a tractor having a mount for attaching at least a trailer of a type that forms an aerodynamic drag source, and a deflector arrangement. The deflector arrangement comprises a deflector, a mount for connecting the deflector to the tractor, means for selectively deploying and retracting the deflector relative to the tractor, a sensor arranged to sense that the trailer that forms the aerodynamic drag force is attached to the tractor and send a loaded signal in response thereto, and a controller arranged to receive the loaded signal from the sensor and to control the selectively deploying and retracting means to deploy the deflector in response to the loaded signal.

According to yet another aspect of the present invention, a method is provided for adjusting a deflector of a deflector arrangement on a tractor of a tractor-trailer combination, the tractor being connectable to a trailer that forms an aerodynamic drag source, the deflector being connected to the tractor, and the deflector arrangement comprising means for selectively deploying and retracting the deflector relative to the tractor. The method comprises sensing that the trailer that forms the aerodynamic drag force is attached to the tractor and sending a loaded signal in response thereto, and controlling the selectively deploying and retracting means to deploy the deflector in response to the loaded signal.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
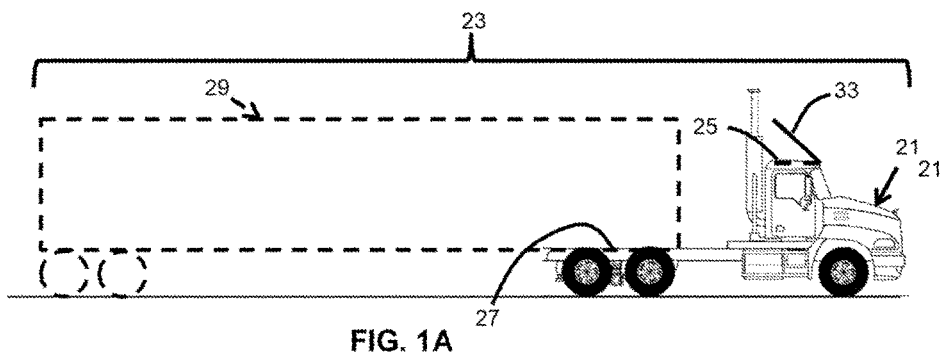
FIGS. 1A-1C are side views of tractor-trailer combinations according to aspects of the present invention.
Figure 1B:
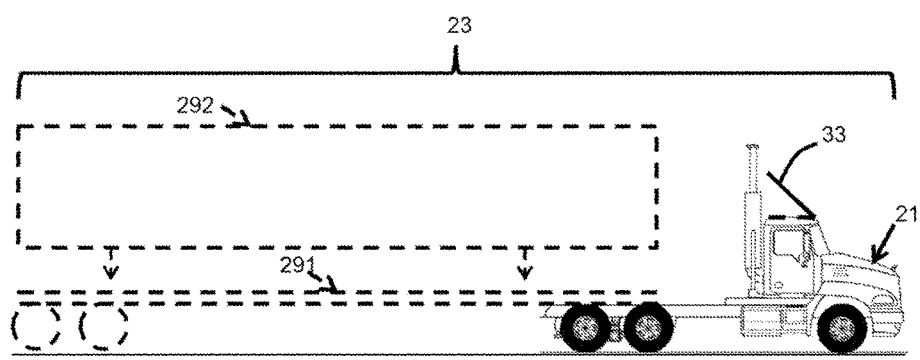
Figure 1C:
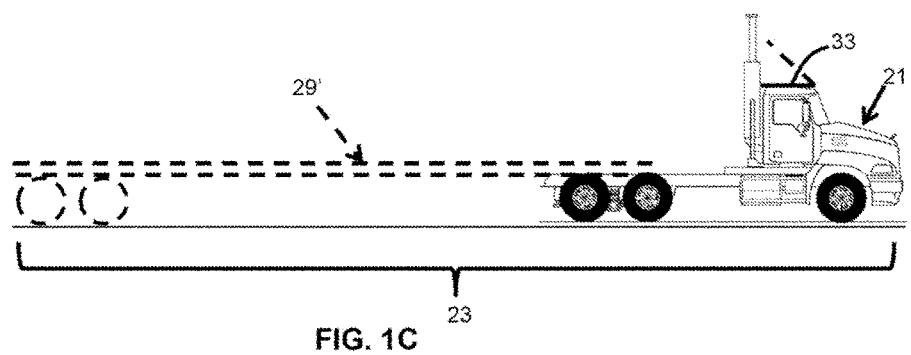

A tractor 21 according to an aspect of the present invention for a tractor-trailer combination 23 as seen in FIG. 1A-1C comprises a roof 25 and a mount 27 (FIG. 1A) for attaching at least a trailer 29 (shown in phantom in FIG. 1A) of a type that forms an aerodynamic drag source. The mount 27 will ordinarily be a conventional "fifth wheel" mount. The trailer 29 that forms the aerodynamic drag force will ordinarily be of a type that has a forward facing surface area that is larger than rear-facing surface area of the tractor 21. For example, the trailer 29 may be of a type with a permanently attached container that extends above the roof 25 of the tractor 21 as seen in FIG. 1A. The trailer 29 may also have a container that extends to the sides of the tractor. The trailer 29 may also be of a drayage type as seen in FIG. 1B that includes a chassis-type trailer 291 without a flatbed but with hooks (not shown) to attach a container 292 to a frame of the trailer wherein a container is attached to the drayage type trailer. The trailer 29 that forms the aerodynamic drag is contrasted with trailers 29' as seen in FIG. 1C of a type that form a different, usually lesser aerodynamic drag, such as flatbed trailers with no loads or with loads that are vertically lower than the roof 25 of the tractor 21 and drayage chassis-type trailers that do not have containers attached thereto.

Figure 2:
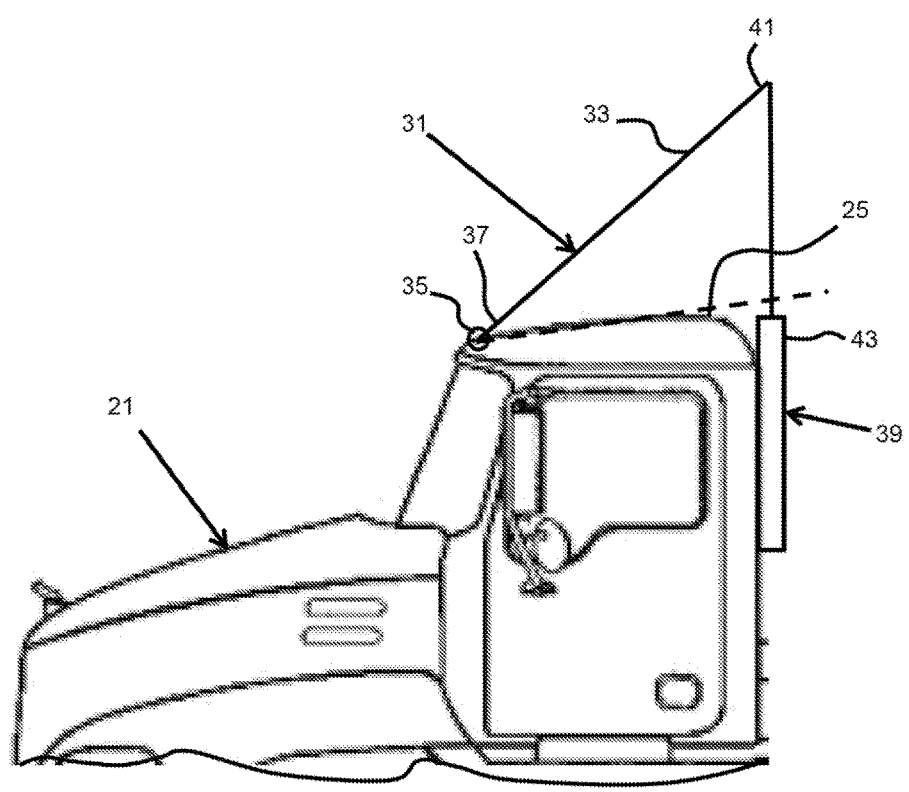
FIG. 2 is a side view of a portion of a tractor including a deflector arrangement according to an aspect of the present invention.

As seen in part in FIG. 2, a deflector arrangement 31 can be part of the tractor 21 or a free-standing arrangement that can be associated with a tractor. The deflector arrangement 31 can include a deflector 33 and a mount 35 for pivotably connecting the deflector to a top of the tractor 21, typically proximate a forward edge 37 of the deflector to the roof 25 of the tractor. The deflector arrangement 31 may also include deflectors (not shown) and mounts for pivotably connecting to the tractor 21, typically proximate a forward edge of the deflectors to the sides of the tractor, typically behind the doors of the tractor. The deflectors attached to the sides of the tractor can function and be controlled in the same way as the deflectors attached to top of the tractor and it will be appreciated that descriptions of the deflectors attached to the top of the tractor can apply equally to the deflectors attached to the sides of the tractor, except where otherwise noted. It will be appreciated that other types of deflectors can also be provided, such as deflectors that change curvature. References to deflectors being "deployed" or "retracted" or "raised" or "lowered" herein are intended to cover all types of deflectors and are not intended to limit the scope of the invention to specific types of deflectors that are pivotably mounted to the trailer. For purposes of discussion, the invention is generally described in connection with deflectors 33 of a type that are pivotably attached to the tractor 21, however, it will be appreciated that the descriptions are also applicable to other types of deflectors.

Means 39 for selectively deploying and retracting the deflector 33, such as by raising and lowering, relative to the tractor 21, a rear edge 41 of a deflector 33 that is pivotably mounted to the tractor, is also provided. The means 39 for selectively deploying and retracting can comprise at least one (typically only one) of a hydraulically driven, a pneumatically driven, or an electro-mechanically driven piston 43 or rod (hereinafter referred to as a piston). Suitable means for selectively deploying and retracting the rear edge 41 of the deflector 33 may include but are not limited to a piston 43 pivotably mounted between the roof 25 and the rear edge 41 of the deflector 33 as seen in FIG. 2. The piston 43 may be connected to the deflector 33 so that an end of the piston is held in and slides in a track on an underside of the deflector so that the point at which the piston and the deflector contact can change as the deflector is deployed and retracted, e.g., raised and lowered. Various other suitable means for selectively deploying and retracting the rear edge 41 of the deflector 33 may be provided, such as piston driven scissor lifts (which can provide space savings) or inflatable and deflatable air bags.

Figure 3:
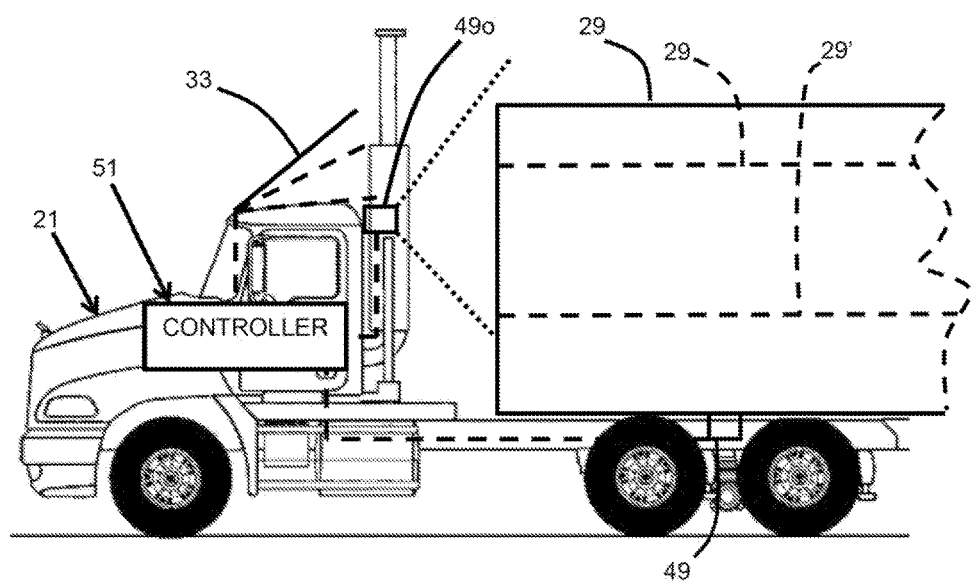
FIG. 3 is a side, partially schematic view of a portion of a tractor-trailer combination according to an aspect of the present invention.

As seen in FIG. 3, a sensor 49 is arranged to sense that the trailer 29 that forms the aerodynamic drag force is attached to the tractor 21 and send a loaded signal in response thereto. A "loaded signal" is used here in the sense of a signal warranting deployment of the deflector 33, such as that a trailer 29 of a type that forms an aerodynamic drag source is attached to the tractor 21. A controller 51 can be arranged to receive the loaded signal from the sensor 49 and to control the selectively deploying and retracting means 39 to deploy, e.g., raise, the deflector 33 in response to the loaded signal. The sensor 49 may also be arranged to sense that no trailer is attached to the tractor 21 and send an unloaded signal in response thereto. The controller 51 may be arranged to receive the unloaded signal from the sensor 49 and to control the selectively deploying and retracting means 39 to retract, e.g., lower, the deflector 33 in response to the unloaded signal. The controller 51 may be part of a conventional engine control unit (ECU) of the type typically provided with vehicles, wherein the ECU is configured to perform the functions of the controller described herein.

The sensor 49 can be arranged to sense that the trailer 29 that forms the aerodynamic drag force is attached to the tractor 21 by one of sensing and calculating a weight of one of the trailer that forms the aerodynamic drag force alone or the tractor with the trailer that forms the aerodynamic drag force, or sensing a height and/or width of a trailer attached to the tractor. In all embodiments, the sensor or sensors and deflectors may be arranged so that the deflectors deploy only upon detection of a "calibratable" load, e.g., a load that would be expected to reflect the attachment of something to the tractor that would likely form the aerodynamic drag force. The sensor 49 may sense the weight of the one of the trailer 29 that forms the aerodynamic drag force alone or the tractor 21 with the trailer that forms the aerodynamic drag force by means of pressure sensitive sensors that may be disposed at suitable points, such as on axles of the tractor-trailer combination 23 and/or on the trailer mount 27 on the tractor, as seen in FIGS. 1A-1C. Instead of (or in addition to) having the sensor on the trailer 29, a sensor may be provided on a chassis-type trailer 291 and arranged to sense a load on the chassis-type trailer such as a container 292 which can be positioned on and removed from the chassis-type trailer while the chassis-type trailer remains attached to a tractor so that the deflectors are deployed when a load is detected. A similar arrangement might be provided on a flatbed trailer, instead of (or in addition to) providing the sensor on the tractor although, for such an application, a manual override may be desirable to retract the deflectors when the load detected is too small, e.g., a dense load of small size. A variety of known sensors are suitable for sensing the presence of the weight sought to be sensed. In addition, the presence of the weight sought to be sensed may be sensed by arrangements such as pressure sensors for sensing suspension air bag pressure.

The sensor 49 may also or alternatively use information sensed or obtained from other sources to sense weight or mass. For example, the weight of the tractor 21 combined with the trailer 29 that forms the aerodynamic drag force can be calculated by a suitable method and arrangement using the controller 51 and other equipment typically provided on heavy duty vehicles, such as via the method and arrangement that is disclosed in International Application No. PCT/US2013/076591 filed Dec. 19, 2013, entitled "METHOD AND VEHICLE WITH ARRANGEMENT FOR ESTIMATING MASS OF THE VEHICLE".

The sensor may also or alternatively comprise an optical sensor. As seen in FIG. 3, an optical sensor 490 can be arranged on the tractor 21 to sense a height and/or width of the trailer 29 that forms the aerodynamic drag force relative to the tractor. The controller 51 can be arranged to control the selectively deploying and retracting means 39 to move the deflector 33 to a position corresponding to the height and/or width of the trailer 29 that forms the aerodynamic drag force, in other words, to a height and/or width that is optimal for the trailer in question, not necessarily the same height and/or width as the trailer. In circumstances when the tractor 21 is connected to a second trailer 29' as seen in FIG. 3 that forms a different aerodynamic drag force than the trailer 29 that forms the aerodynamic drag force, the optical sensor 49o can be arranged to sense whether the tractor is connected to the trailer that forms the aerodynamic drag source or the second trailer by determining whether the dimensions of the trailer being towed, particularly the height and/or width of the trailer relative to the tractor, warrant deployment of the deflector. The optical sensor 49o can be further arranged to send the loaded signal only when the tractor 21 is connected to the trailer 29 that forms the aerodynamic drag source. For example, when the second trailer 29' is vertically lower than the trailer 29 that forms the aerodynamic drag source, an optical sensor can sense that the tractor is connected to the second trailer and send an unloaded signal to the controller 51 to cause the deflector to retract.

The controller 51 can be arranged to receive the loaded signal from the sensor 49 and to control the selectively deploying and retracting means 39 to deploy, e.g., raise, the deflector 33 in response to the loaded signal. The controller 51 can also be arranged to control the selectively deploying and retracting means 39 to retract, e.g., lower, the deflector 33 when no loaded signal is received from the sensor 49.

Figure 4:
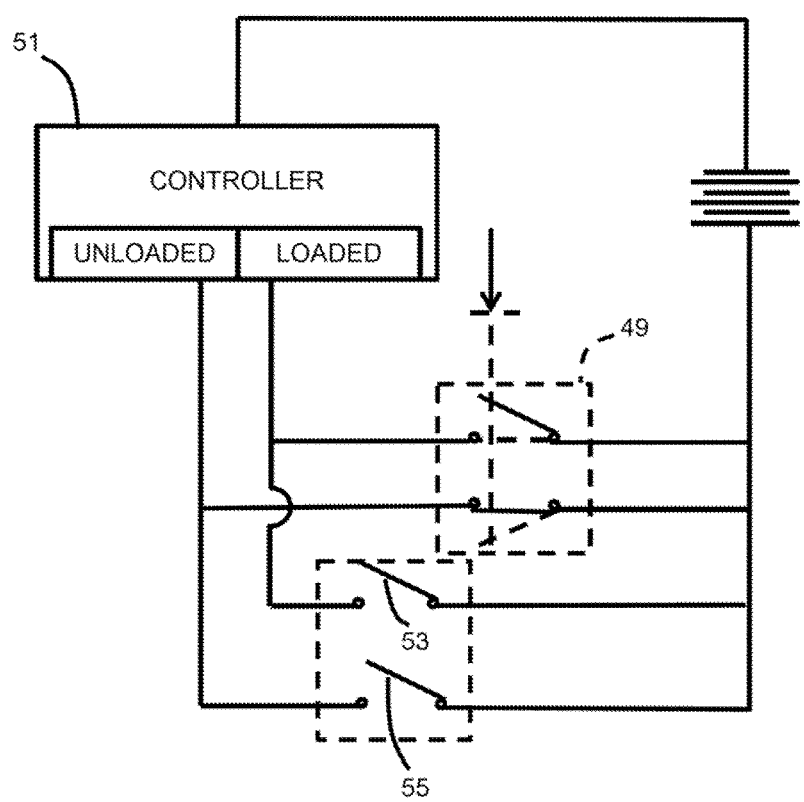
FIG. 4 is a schematic view of a circuit for a manual override arrangement according to an aspect of the present invention.

The controller 51 can also comprise a manual override arrangement for controlling the controller 51 to control the selectively deploying and retracting means 39 to deploy or retract, e.g., raise or lower, the deflector 33 in response to a manual override signal. The manual override arrangement may take any desired form, such as manually operable switches 53 and 55 as seen in FIG. 4 that cause loaded or unloaded signals to be sent to the controller 51 as desired to deploy or retract, e.g., raise or lower, the deflector 33, in spite of any actual signal sent by the sensor 49 (shown in a position to send an unloaded signal and, in phantom, a loaded signal).

As seen in FIGS. 1A-1C, the deflector 33 is movable between a fully deployed position (shown in phantom in FIG. 1C) and a fully retracted position (shown in phantom in FIGS. 1A and 1B). The controller 51 can be arranged to control the selectively deploying and retracting means 39 to move the deflector 33 to the fully deployed position, the fully retracted position, and at least one position between the fully deployed position and the fully retracted position as seen in FIG. 3. The controller 51 can be arranged to control the selectively deploying and retracting means 39 to move the deflector 33 to an infinite number of positions between the fully deployed position and the fully retracted position.

Figure 5:
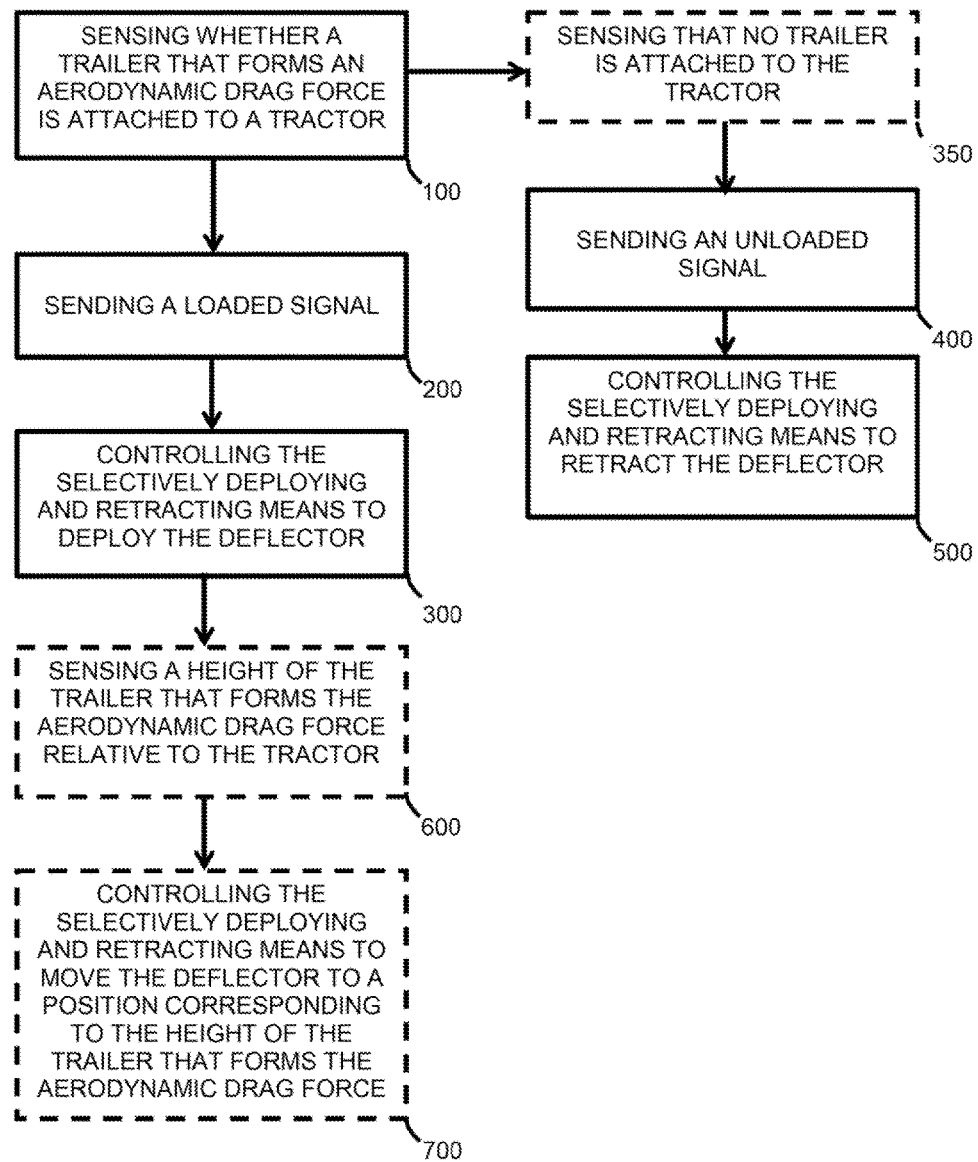
FIG. 5 is a flow chart showing steps in a method for adjusting a deflector.

A method for adjusting the deflector 33 of the deflector arrangement 31 for the tractor 21 of the tractor-trailer combination 23 is described in connection with FIG. 5. The tractor 21 is connectable to the trailer 29 that forms an aerodynamic drag source, and the deflector 33 is pivotably connected to a roof 25 of the tractor proximate a forward edge 37 of the deflector. The deflector arrangement 31 comprises means 39 for selectively deploying and retracting the rear edge 41 of the deflector 33 relative to the roof 25 of the tractor. The method comprises a step 100 of sensing whether the trailer 29 that forms the aerodynamic drag force is attached to the tractor 21 and, if YES, sending a loaded signal in response thereto at step 200. At step 300, the controller 51 controls the selectively deploying and retracting means 39 to deploy the deflector 33 in response to the loaded signal.

If no loaded signal is received from the sensor, at step 500, the controller 51 controls the selectively deploying and retracting means 39 to retract the deflector 33. As seen in phantom at step 350, if the answer at step 100 is NO, the sensor 49 may, prior to step 500, sense that no trailer is attached to the tractor 21 and send, at step 400 an unloaded signal in response thereto, and the controller 51 can control the deflector 33 to be retracted, e.g., lowered, in response to the unloaded signal.

The step 100 of sensing that the trailer 29 that forms the aerodynamic drag force is attached to the tractor 21 may be performed in any suitable fashion, such as by one of sensing and calculating a weight of one of the trailer that forms the aerodynamic drag force alone or the tractor with the trailer that forms the aerodynamic drag force.

As shown in phantom at step 700, the selectively deploying and retracting means 39 can move the deflector 33 to at least one position, typically an infinite number of positions, between a fully deployed position and the fully retracted position. This can be done in response to, e.g., a step 600 (shown in phantom) of sensing the height and/or width of the trailer 29 that forms the aerodynamic drag force sensed by the sensor 49 relative to the tractor. At step 700 (shown in phantom), the selectively deploying and retracting means 39 can be controlled to move the deflector to a position corresponding to the height and/or width of the trailer that forms the aerodynamic drag force, which can be an optimal position between fully deployed and fully retracted and is not necessarily equal to the height and/or width of the trailer.

The tractor 21 can be connectable to a second trailer 29' that forms a different aerodynamic drag force than the trailer 29 that forms the aerodynamic drag force. The method can, accordingly, comprise sensing at step 350 whether the tractor 21 is connected to the trailer 29 that forms the aerodynamic drag source or the second trailer 29'. The loaded signal can only be sent at step 200 when the tractor 21 is connected to the trailer 29 that forms the aerodynamic drag source.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A deflector arrangement for a tractor, the tractor being connectable to a trailer that forms an aerodynamic drag source, comprising:
   a deflector;
   a mount for connecting the deflector to the tractor;
   means for selectively deploying and retracting the deflector relative to the tractor;
   a sensor arranged to sense that the trailer that forms the aerodynamic drag force is attached to the tractor and send a loaded signal in response thereto; and
   a controller arranged to receive the loaded signal from the sensor and to control the selectively deploying and retracting means to deploy the deflector in response to the loaded signal.

2. The deflector arrangement as set forth in claim 1, wherein the controller is arranged to control the selectively deploying and retracting means to retract the deflector when no loaded signal is received from the sensor.

3. The deflector arrangement as set forth in claim 1, wherein the sensor is arranged to sense that no trailer is attached to the tractor and send an unloaded signal in response thereto, and the controller is arranged to receive the unloaded signal from the sensor and to control the selectively deploying and retracting means to retract the deflector in response to the unloaded signal.

4. The deflector arrangement as set forth in claim 1, wherein the sensor is arranged to sense that the trailer that forms the aerodynamic drag force is attached to the tractor by one of sensing and calculating a weight of one of the trailer that forms the aerodynamic drag force alone or the tractor with the trailer that forms the aerodynamic drag force.

5. The deflector arrangement as set forth in claim 1, wherein the sensor comprises an optical sensor.

6. The deflector arrangement as set forth in claim 1, wherein the selectively deploying and retracting means comprises at least one of a hydraulically driven, a pneumatically driven, or an electro-mechanically driven piston.

7. The deflector arrangement as set forth in claim 1, wherein the controller comprises a manual override arrangement for controlling the controller to control the selectively deploying and retracting means to deploy or retract the deflector in response to a manual override signal.

8. The deflector arrangement as set forth in claim 1, wherein the deflector is movable between a fully deployed position and a fully retracted position.

9. The deflector arrangement as set forth in claim 8, wherein the controller is arranged to control the selectively deploying and retracting means to move the deflector to the fully deployed position, the fully retracted position, and at least one position between the fully deployed position and the fully retracted position.

10. The deflector arrangement as set forth in claim 8, wherein the sensor is arranged to sense a height of the trailer that forms the aerodynamic drag force relative to the tractor and the controller is arranged to control the selectively deploying and retracting means to move the deflector to a position corresponding to the height of the trailer that forms the aerodynamic drag force.

11. The deflector arrangement as set forth in claim 1, wherein the tractor is connectable to a second trailer that forms a different aerodynamic drag force than the trailer that forms the aerodynamic drag force, and the sensor is arranged to sense whether the tractor is connected to the trailer that forms the aerodynamic drag source or the second trailer, the sensor being further arranged to send the loaded signal only when the tractor is connected to the trailer that forms the aerodynamic drag source.

12. The deflector arrangement as set forth in claim 11, wherein the second trailer is vertically lower than the trailer that forms the aerodynamic drag source, and the sensor comprises an optical sensor that senses that the tractor is connected to the second trailer.

13. A tractor for a tractor-trailer combination, comprising:
a tractor having a mount for attaching at least a trailer of a type that forms an aerodynamic drag source; and
a deflector arrangement, comprising
a deflector,
a mount for connecting the deflector to the tractor,
means for selectively deploying and retracting the deflector relative to the tractor,
a sensor arranged to sense that the trailer that forms the aerodynamic drag force is attached to the tractor and send a loaded signal in response thereto, and
a controller arranged to receive the loaded signal from the sensor and to control the selectively deploying and retracting means to deploy the deflector in response to the loaded signal.

14. A method for adjusting an deflector of a deflector arrangement on a tractor of a tractor-trailer combination, the tractor being connectable to a trailer that forms an aerodynamic drag source, the deflector being connected to the tractor, and the deflector arrangement comprising means for selectively deploying and retracting the deflector relative to the tractor, comprising:
sensing that the trailer that forms the aerodynamic drag force is attached to the tractor and sending a loaded signal in response thereto; and
controlling the selectively deploying and retracting means to deploy the deflector in response to the loaded signal.

15. The method as set forth in claim 14, comprising controlling the selectively deploying and retracting means to retract the deflector when no loaded signal is received from the sensor.

16. The method as set forth in claim 14, comprising sensing that no trailer is attached to the tractor and sending an unloaded signal in response thereto, and retracting the deflector in response to the unloaded signal.

17. The method as set forth in claim 14, comprising sensing that the trailer that forms the aerodynamic drag force is attached to the tractor by one of sensing and calculating a weight of one of the trailer that forms the aerodynamic drag force alone or the tractor with the trailer that forms the aerodynamic drag force.

18. The method as set forth in claim 14, comprising controlling the selectively deploying and retracting means to move the deflector to a fully deployed position, a fully retracted position, and at least one position between the fully deployed position and the fully retracted position.

19. The method as set forth in claim 14, comprising sensing a height of the trailer that forms the aerodynamic drag force relative to the tractor and controlling the selectively deploying and retracting means to move the deflector to a position corresponding to the height of the trailer that forms the aerodynamic drag force.

20. The method as set forth in claim 14, wherein the tractor is connectable to a second trailer that forms a different aerodynamic drag force than the trailer that forms the aerodynamic drag force, the method comprising sensing whether the tractor is connected to the trailer that forms the aerodynamic drag source or the second trailer, and sending the loaded signal only when the tractor is connected to the trailer that forms the aerodynamic drag source.

* * * * *